United States Patent
Gehrke

(10) Patent No.: US 9,599,467 B2
(45) Date of Patent: Mar. 21, 2017

(54) METHOD AND ARRANGEMENT FOR TESTING THE PROPER FUNCTIONALITY OF AN ELEVATOR

(75) Inventor: Matthias Gehrke, Nuremberg (DE)

(73) Assignee: DEKRA E.V. (EINGETRAGENER VEREIN), Stuttgart (DE)

( * ) Notice: Subject to any disclaimer, the term of this patent is extended or adjusted under 35 U.S.C. 154(b) by 0 days.

(21) Appl. No.: 14/364,833

(22) PCT Filed: Dec. 15, 2011

(86) PCT No.: PCT/EP2011/072961
§ 371 (c)(1),
(2), (4) Date: Jun. 12, 2014

(87) PCT Pub. No.: WO2013/087115
PCT Pub. Date: Jun. 20, 2013

(65) Prior Publication Data
US 2014/0347649 A1 Nov. 27, 2014

(51) Int. Cl.
*G01C 3/08* (2006.01)
*B66B 5/00* (2006.01)

(52) U.S. Cl.
CPC ............. *G01C 3/08* (2013.01); *B66B 5/0018* (2013.01); *B66B 5/0037* (2013.01)

(58) Field of Classification Search
CPC ........ G01C 3/08; B66B 5/0018; B66B 5/0037
See application file for complete search history.

(56) References Cited

U.S. PATENT DOCUMENTS

| 2008/0121703 A1* | 5/2008 | Li et al. ............ 235/385 |
| 2008/0156591 A1* | 7/2008 | Tracey ................ 187/394 |
| 2009/0166133 A1* | 7/2009 | Tyni et al. ........... 187/393 |
| 2010/0208232 A1 | 8/2010 | Hara |

FOREIGN PATENT DOCUMENTS

| DE | 39 11 391 C1 | 10/1990 | |
| DE | 101 50 284 A1 | 4/2003 | |
| DE | 10 2006 042 909 A1 | 9/2006 | |
| DE | 10 2006 011 395 | 9/2007 | |
| DE | 10 2009 026 992 A1 | 6/2009 | |
| DE | 102010002035 | 8/2010 | |
| DE | EP 2221268 A1 * | 8/2010 | ........... B66B 5/0037 |
| EP | 1 749 781 A1 | 5/2004 | |
| EP | 2 221268 A1 | 2/2010 | |
| EP | 2 221268 B1 | 4/2014 | |
| JP | 11043270 A | 7/1997 | |
| JP | H09-216736 | 8/1997 | |

(Continued)

*Primary Examiner* — Luke Ratcliffe
*Assistant Examiner* — Samantha K Abraham
(74) *Attorney, Agent, or Firm* — Roberts Mlotkowski Safran Cole & Calderon P.C.; George H. Spencer

(57) ABSTRACT

The invention relates to a method for testing the proper functionality of an elevator, in which a car (3) is movable in an elevator shaft having an elevator shaft excavation space, and a characteristic value is ascertained under predefined test conditions to determine the proper functionality of the elevator. To simplify the method, it is proposed according to the invention that a change of the distance (A) between a car lower side and a fixed measuring point in the elevator shaft excavation space be measured to ascertain the characteristic value.

11 Claims, 12 Drawing Sheets

(56) References Cited

FOREIGN PATENT DOCUMENTS

Figure 1:
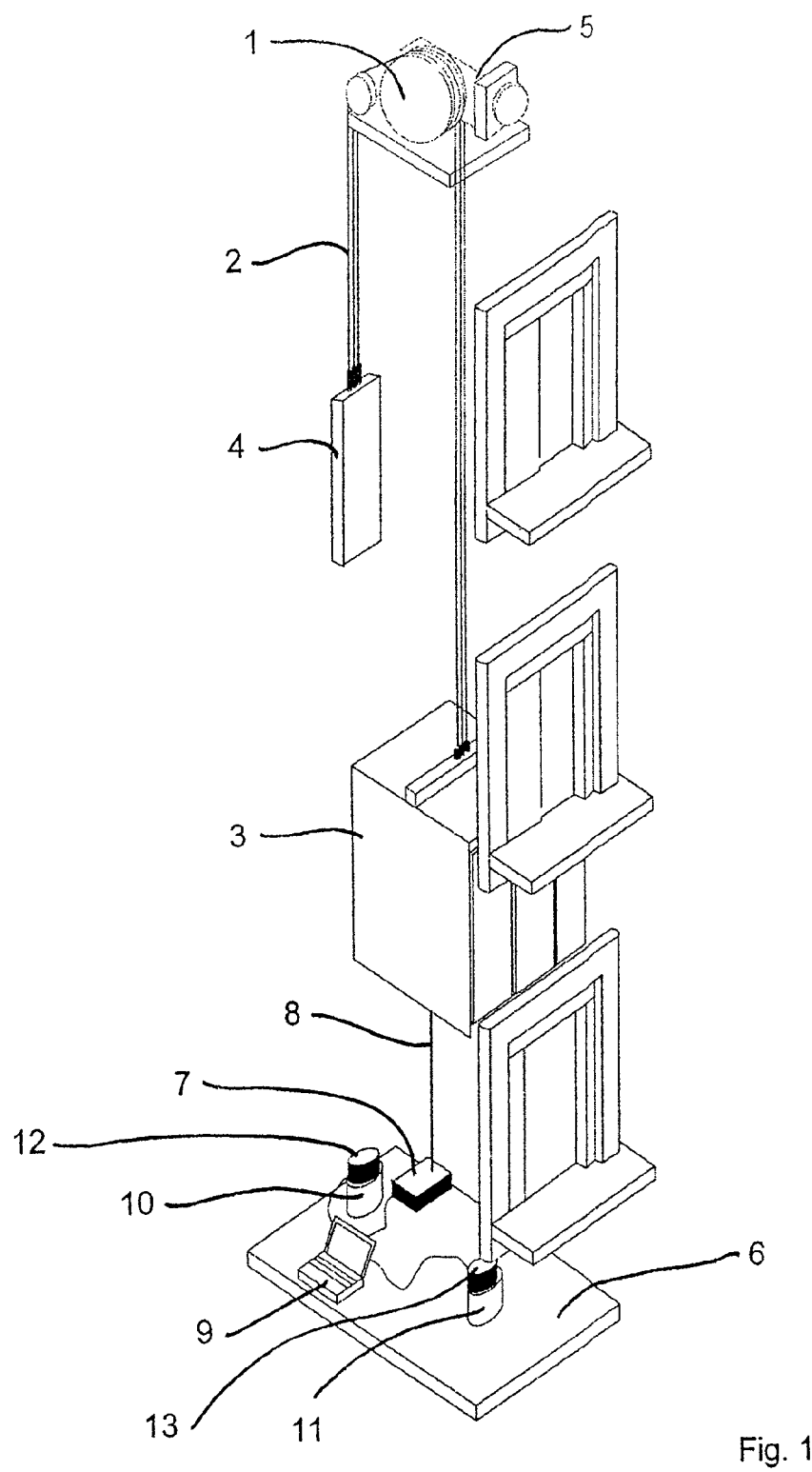

| | | |
|---|---|---|
| JP | 2001171929 | 6/2001 |
| JP | 2001/171929 | 7/2003 |
| JP | 2003-212448 A | 7/2003 |
| JP | 2006-125885 | 10/2004 |
| JP | 2010-190634 | 2/2009 |
| JP | 2010190634 A * | 9/2010 |
| WO | WO 2009/150251 A2 | 6/2009 |

* cited by examiner

METHOD AND ARRANGEMENT FOR TESTING THE PROPER FUNCTIONALITY OF AN ELEVATOR

The invention relates to a method and an arrangement for testing the proper functionality, in particular a traction capacity, over-traction capacity, safety gear, and the like of an elevator, in which a car is movable in an elevator shaft having an elevator shaft excavation space, and a characteristic value being ascertained under predefined test conditions to determine the proper functionality of the elevator.

DE 101 50 284 A1 discloses a method for diagnosing elevator facilities. The car is provided with an acceleration sensor. The acceleration values measured using the acceleration sensor are transmitted to an analysis unit arranged outside the car.

DE 10 2006 011 395 A1 discloses a measuring device for a traction capacity measurement of an elevator system. The measuring device has a fastening device for positioning on multiple support cables. Furthermore, it has a fixing device for at least one of the support cables.

DE 39 11 391 C1 describes a method and a device for testing the traction capacity. Between at least one cable of a cable pull and a fixed point, the force transmitted thereto via the cable pull is ascertained by means of a force measuring signal encoder, until the cable begins to slip on the drive pulley. For this purpose, a first distance sensor can additionally be connected to a cable of the cable pull and a second distance sensor can be connected to the drive pulley.

The devices necessary for performing the known methods require a relatively high level of effort during the installation of the sensors. The performance of the typical methods is connected with a high time expenditure.

The object of the present invention is to remedy the disadvantages according to the prior art. In particular, a method which is as simple and efficient to perform as possible for testing the proper functionality of an elevator is to be specified. According to a further object of the invention, an arrangement is to be specified, using which the proper functionality of an elevator can be tested rapidly, simply, and efficiently.

This object is achieved by the features set forth in the appended claims which also define the features of expedient embodiments of the invention.

As provided by the invention, in a method for testing the proper functionality of an elevator, it is proposed that to ascertain the characteristic value, a change of the distance between the car and a fixed measuring point in the elevator shaft is measured by means of an optical distance measuring device. It is therefore possible in a surprisingly simple way to perform the method for testing the proper functionality of the elevator rapidly and efficiently. According to the proposed method, in particular a complex and time-consuming attachment of measuring devices to cables and/or the drive pulley and/or the laying of cables to a sensor outside the elevator shaft can be dispensed with. The proposed method is additionally particularly universal, since the embodiment of the elevator shaft is established by standards. As a result, elevator shafts hardly differ even in the event of a differing embodiment of elevators. This further simplifies the testing of the proper functionality of the elevator.

According to an advantageous embodiment, the fixed measuring point is located in the elevator shaft excavation space, the distance to a car lower side of the car being measured in this case. The elevator shaft excavation space is easily accessible to the testing engineer. A distance measuring device capable of measuring the change of the distance can be arranged therein without great effort.

The change of the distance is measured by means of an optical distance measuring device. The distance measuring device expediently comprises a clock generator, which allows a time-resolved measurement of the distance of the car in relation to a fixed measuring point, for example. The clock generator can be a component of a computer, for example, to which the distance measuring device is connected to transmit and analyze the measured values measured therewith.

It has proven to be expedient to measure and record at least 500, preferably 700 to 2500, distance values per second using the distance measuring device. 800 to 1200 distance values per second are expediently measured and analyzed using downstream analysis electronics. Using the proposed registration frequency of the measured values, the dynamic behavior of the car can be registered in testing routines which are prescribed for testing the proper functionality. The results achieved are substantially more precise than the results achievable using typical testing routines. The method may simultaneously be performed more easily and cost-effectively. The distance values, expediently 900 to 1100 per second, can also be recorded as a function of measured values delivered by a force measuring device. The above-mentioned measuring frequency can also be used in this case.

The distance measuring device expediently forms the fixed measuring point. This simplifies the method. Complex alignment work in relation to a fixed measuring point implemented as a mirror, for example, and possibly required cable laying work to a computer are dispensed with.

In practice, it has proven to be particularly advantageous for the distance measuring device to be placed in an elevator shaft excavation space, which is delimited by a floor of the elevator shaft, its walls, and an imaginary surface, which rests on an upper side of cushions supported on the floor. The elevator shaft excavation space is relatively easily accessible. The distance measuring device can be securely housed below the imaginary surface, which rests on the upper side of the cushions. Damage to the distance measuring device is not a concern even if the car or the counterweight is placed on the cushions. According to a particularly simple embodiment, the distance measuring device is supported on the floor of the elevator shaft excavation space.

According to a further particularly advantageous embodiment of the invention, an optical distance sensor is used as the distance measuring device, which has at least one sensor, which emits transmitted light beams along an optical axis, at least one oscillator for modulating the transmitted light beams, and a receiver, which receives a received light beam, having means for determining the runtime of the received light beams reflected from the car lower side. Using the proposed optical distance sensor, in particular the chronological change of the distance of the car can be determined from the phase difference between transmitted and received light beams. The transmitted and the received light beams are not pulsed in this embodiment. The distance measurement is performed by frequency measurement. Such a frequency measurement can be implemented with little circuitry expenditure. It is therefore possible to measure the chronological change of a distance between the car lower side and the fixed measuring point particularly exactly and with high resolution.

According to a further embodiment of the invention, it is provided that the means for determining the runtime comprise a phase difference detector, which is connected to the receiver via an electrical signal pathway. An electronic signal delay unit can be connected into the electrical signal pathway, using which a phase difference between transmitted and received light beams can be set or regulated to a predefined value. To determine the phase shift, at least one synchronous rectifier is expediently provided between transmitted and received light beams. The transmitter can be modulated by an upstream oscillator having a constant frequency, so that the output of a clock oscillator is conducted to the synchronous rectifier, the frequency of the clock oscillator being adjustable by feedback of the output signal of the synchronous rectifier. The phase difference between the signals of the oscillator and the clock oscillator can be determined in a phase detector and analyzed in the analysis unit as a measure of the distance. The modulation frequency of the transmitted light beams can also be adjustable to determine the phase shift between transmitted and received light beams, in that the integrated output signal of the synchronous rectifier is fed back to an oscillator upstream from the transmitter, the modulation frequency set in the oscillator being analyzed in the analysis unit as a measure of the distance. A distance measuring device having the above-mentioned features is particularly well suitable for measuring the distance of the car in relation to the fixed measuring point. A measuring frequency which is thus achievable allows a measurement of the time change of the distance in the millisecond range. Decelerations and/or accelerations may thus be registered, which occur, for example, upon triggering of safety gear, in the event of an emergency stop, or the like. The proposed distance measuring device is thus universally suitable for ascertaining all speed-dependent and/or acceleration-dependent characteristic values during the testing of the proper functionality of an elevator.

The optical distance sensor is advantageously supported on the floor of the elevator shaft excavation space and a reflector is attached to the car lower side. The support of the optical distance sensor on the shaft floor may be implemented particularly simply. Cumbersome installation work is not necessary.

According to a further embodiment, an analysis unit is provided for analyzing the reception signals available at the output of the receiver. The receiver can have a light-sensitive surface, whose normal vector is inclined by a predefined tilt angle to the optical axis. Light can therefore be prevented from being reflected from the receiver into the area of the optical axis, which could result in corruption of the measurement results. The tilt angle is expediently in the range from 10 to 30°.

For analyzing the measured values, it has proven to be particularly advantageous to use a low-pass filter, preferably an SG-FIR low-pass filter, and to filter the measured values therewith. The combination of the optical distance sensor with the proposed filter results in particularly reliable results.

To ascertain the characteristic value, the distance can be measured as a function of time in particular and an acceleration of the car can be ascertained therefrom. The acceleration can be ascertained easily and precisely by the second derivative of the distance values measured over time. Based on an acceleration ascertained in this manner, a plurality of characteristic values, which represent the proper functionality of an elevator, can be ascertained.

The characteristic value may be a value which represents the functionality of a safety gear and/or a traction capacity.

Further, the characteristic value may be a value representing an over-traction capacity and/or a minimum traction capacity of the elevator.

According to a further embodiment of the invention a reflector for reflecting the transmitted light beam is attached to the car lower side.

According to an embodiment of the invention it is provided to automatically align the light beam with the reflector. The proposed automatic alignment assures that distance values can be measured without interruption or with small interruptions along the whole track of movement of the car. Further, it is possible to perform the measurement of the distance values even if the optical distance sensor which emits the light beam, in particular a laser beam, is not exactly positioned normal with respect to a direction of movement of the car.

An alignment of the emitted light beam can e.g. be performed by one or more mirrors which can be tilted by one or more actuators. Further, it is possible to perform the tracking of the emitted light beam with the reflector by adjusting the optical distance sensor. For this purpose e.g. a length of stents on which the optical distance sensor is supported may be adjusted, e.g. by servo-motors.

In order to assure an automatic tracking of the emitted light beam there may be provided a closed-loop control. Thereby it is detected whether or not the emitted light beam is reflected at the reflector. Such detection may be performed by the receiver.

As soon as it is detected that the emitted light beam is not reflected at the reflector, the emitted light beam is then moved in accordance with a predetermined algorithm. According to the algorithm the emitted light beam may be moved along a first straight line and thereafter along a second straight line which is perpendicular to the first straight line. The emitted light beam may also be moved along the path of a circle. The extent of the movement is advantageously performed in dependency of the distance of the reflector from the optical distance sensor. For calculation of the distance there is used the last distance value which is measured before it was detected that the emitted light beam is no longer reflected at the reflector. By calculating the extent of the movement of the emitted light beam in dependency on the last distance value it can be achieved that the tracks of movement of the emitted light beam have always the same extent or size, respectively, irrespective of the distance of the car from the optical distance sensor. This assures a rapid tracking and alignment of the emitted light beam with the reflector.

According to a further advantageous embodiment the correct alignment of the emitted light beam with the reflector is saved electronically in dependency of the distance. This allows to automatically align the light beam during the next movement of the car within the elevator shaft.

According to a further advantageous embodiment of the method, in an elevator to be tested, in which the car is provided with a safety gear and is connected to a counterweight via at least one cable guided over a drive pulley, the following steps are performed to ascertain a characteristic value which represents the functionality of the safety gear:

moving the car downward;
triggering the safety gear;
measuring a distance of the car in relation to the fixed measuring point in relation to time; and
ascertaining the deceleration Vf of the car, which is caused by the triggering of the safety gear, from the measured values.

In that a distance change of the car in relation to the fixed measuring point is directly measured over time, the deceleration of the car upon triggering of the safety gear can be ascertained particularly precisely. The method may be performed surprisingly easily. In particular, it is not necessary to attach a measuring device to a cable, the drive pulley, or the like.

According to an advantageous embodiment, the downward movement is performed using unloaded car. This simplifies the method according to the invention. The safety gear is expediently triggered in a lower half, preferably a lower third, particularly preferably in a lower fourth of a route of the car. Because of the thus increasing cable length between drive pulley and car, the safety gear is particularly strongly stressed in a lower section of the route. Particularly informative values result for the functionality of the safety gear in a lower section of the route.

According to a further advantageous embodiment of the invention, the downward movement is performed at nominal speed. This further simplifies the proposed method.

The deceleration Vf for the car loaded with nominal load can be ascertained according to the following formula:

$$Vf = (mFK * \ddot{s} + mFK * g)/(mFK + NL) - g \quad (1)$$

where: NL=nominal load specified in the car
g=gravitational acceleration
$\ddot{s}$=second derivative of the measured distance with respect to time, and
mFK=mass of the car.

According to a further embodiment of the method, in the elevator to be tested, in which the car is connected to a counterweight via at least one cable, which is guided over a drive pulley, and a braking device is provided for braking the drive pulley, the following steps are performed to ascertain a characteristic value which describes a traction capacity T of the drive pulley:

moving the car;
triggering the braking device;
measuring a distance of the car in relation to a fixed measuring point over time; and
ascertaining the traction capacity T of the drive pulley from the measured values.

In that according to the invention the distance of the car lower side is measured, the proposed method may be performed surprisingly simply and reliably. In particular, the time-consuming installation of measured value pickups on cables, the drive pulley, or the like can be dispensed with. Notwithstanding this, the traction capacity of the drive pulley upon triggering of the braking device can be ascertained with improved precision from a measurement of the change of the distance of the car in relation to a fixed measuring point.

As defined in the present invention, the term "braking device" is generally to be understood as a drive pulley brake which acts directly on the drive pulley or also a transmission or motor brake which acts indirectly on the drive pulley. The term "elevator shaft" is also to be understood generally as defined in the present invention. It is to be understood to include elevator shafts having both full and also partial railings. As defined in the present invention, the "distance" is a distance measured essentially in the movement direction of the car. An "elevator" is understood as both an elevator having a car movable in the vertical direction and also an inclined elevator, in which the car is movable by at least 15° diagonally in relation to the horizontal.

The traction capacity in the event of emergency stop as defined in DIN EN 81-1 can be ascertained in particular using the proposed method. For this purpose, the distance of the car over time is measured directly during movement of the car and the braking device is triggered. The deceleration of the movement after triggering of the braking device may be ascertained from the measured distance by the second derivative according to time. In contrast to the prior art, it is not necessary to use integration constants for the calculation here. The use of integration constants results in inaccuracies in the calculation.

The movement is advantageously performed using unloaded car. This further increases the efficiency of the proposed method. Of course, it is also possible to load the car with nominal load, for example.

According to a further advantageous embodiment of the invention, the movement of the car is performed at nominal speed. This further simplifies the proposed method.

The car is expediently moved upward to ascertain the traction capacity T. However, it is also possible using the method according to the invention to determine the traction capacity of a downward movement of the car at high precision.

The traction capacity T is expediently ascertained according to the following formula:

$$T = \frac{T2}{T1} = \frac{\frac{mGG*(\ddot{s}+g)}{V} - mC*g - mD*g + (mC+mD)*V*\ddot{s}}{\frac{mFK*(g-\ddot{s})}{V} - mB*g + mA*g - (mA+mB)*V*\ddot{s}} \quad (2)$$

where:
$\ddot{s}$=a(t)=ascertained deceleration at the time t
A=measured distance from the shaft excavation to the floor of the car
FH=measured conveyor height
AH=calculated height of the drive after input of the floor position of the drive
mFK=mass of the car
mGG=mass of the counterweight
V=suspension ratio, 1:1 or 2:1
n=number of cables
sg=specific cable weight in Kg/m
g=acceleration
mA=(FH−A)*sg*n
mB=(FH−AH)*sg*n
mC=(FH−AH)*sg*n
mD=A*sg*n.

To test the proper functionality of an elevator, in addition to the explained method for testing the traction capacity in the event of emergency stop, it is additionally necessary to ascertain further characteristic values. For this purpose, the method according to the invention, which forms a test sequence, can be combined with further test sequences. For this purpose, it has proven to be expedient to support a first force measuring device on at least one first cushion corresponding to the counterweight and to support a second force measuring device on at least one second cushion corresponding to the car. The force measuring devices are therefore also introduced into the elevator shaft excavation space and are therefore located close to the distance measuring device. This advantageously allows the measured values of the distance measuring device and/or the force measuring devices to be registered and analyzed by means of a computer connected thereto, which is preferably placed in the elevator shaft excavation space. The setup of a measuring device which comprises the force measuring devices, the distance measuring device, and the computer in the elevator shaft excavation may be performed rapidly and easily. All characteristic values required for testing the proper functionality of an elevator can be ascertained using such a measuring device.

The over-traction capacity of the elevator can thus be measured in a further test sequence. In an elevator to be tested, in which the car is connected to a counterweight via at least one cable, which is guided over a drive pulley, the following steps can be performed to ascertain a characteristic value which describes an over-traction capacity of the elevator:

placing the counterweight on the first force measuring device;

moving the drive pulley in a direction which raises the car until cable slip occurs;

measuring the force acting on the first force measuring device over time; and ascertaining the over-traction capacity from the measured values.

The proposed second test sequence can be performed easily and rapidly using the above-described measuring device. The over-traction capacity T' can be ascertained according to the following formula:

$$T' = \frac{T2'}{T1'} = \frac{\frac{mFK}{V}*g + (mA-mB)*g}{\frac{mGG}{V}*g + (mD-mC)*g - \frac{Fm'}{V}} \quad (3)$$

where: mGG=mass of the counterweight
Fm'=measured force upon cable slip
mFK=mass of the car
A=measured distance from the shaft excavation to the floor of the car
FH=measured conveyor height
AH=calculated height of the drive after input of the floor position of the drive
V=suspension ratio, 1:1 or 2:1
n=number of cables
sg=specific cable weight in Kg/m
g=acceleration of gravity
mA=(FH–A)*sg*n
mB=(FH–AH)*sg*n
mC=(FH–AH)*sg*n
mD=A*sg*n.

Furthermore, the method according to the invention can be combined with a further test sequence. In an elevator to be tested, in which the car is connected to a counterweight via at least one cable, which is guided over a drive pulley, the following steps can be performed to ascertain a characteristic value which describes a minimum traction capacity of the elevator:

placing the car on the second force measuring device;

moving the drive pulley in a direction which raises the counterweight until cable slip occurs;

measuring the force acting on the second force measuring device over time; and ascertaining the minimum traction capacity from the measured values.

The proposed further test sequence can also be performed easily and rapidly using the above-described measuring device. The minimum traction capacity T″ can be ascertained according to the following formula:

$$T'' = \frac{T2''}{T1''} = \frac{\frac{mGG}{V}*g + (mD-mC)*g}{\frac{mFK}{V}*g + (mA-mB)*g - \frac{Fm''}{V}} \quad (4)$$

where: mGG=mass of the counterweight
Fm″=measured force upon cable slip
mFK=mass of the car
A=measured distance from the shaft excavation to the floor of the car
FH=measured conveyor height
AH=calculated height of the drive after input of the floor position of the drive
V=suspension ratio, 1:1 or 2:1
n=number of cables
sg=specific cable weight in Kg/m
g=acceleration of gravity
mA=(FH–A)*sg*n
mB=(FH–AH)*sg*n
mC=(FH–AH)*sg*n
mD=A*sg*n.

A weight of the car can be ascertained according to the following formula:

$$g*mFK = \frac{F_{m1}}{\ddot{s}} \quad (5)$$

where:
g=acceleration of gravity
$F_{m1}$=measured force at time $t_1$
$\ddot{s}$=deceleration at time $t_1$
mFK=mass of the car Furthermore, a weight of the car can also be ascertained according to the following formula:

$$mFK = \frac{F_{m1} - \left(\frac{F_{m2}}{g} + mFK\right)*g - \left(\frac{F_{m2}}{g} + mFK\right)*a_1}{a_1 - g} = \quad (6)$$

$$\frac{F_{m1} - F_{m2} - F_{m2}*\frac{a_1}{g}}{2*a_1}$$

where:
mFK=mass of the car
$F_{m1}$=measured first force on the force measuring device at time $t_1$
$F_{m2}$=measured second force on the force measuring device
g=acceleration of gravity
$a_1$=deceleration at time $t_1$.

Furthermore, it is advantageously possible particularly simply using the distance measuring device provided according to the invention to calculate the respective proportional cable weight on the counterweight side and/or on the car side and take it into consideration when determining the characteristic values.

Furthermore, the method according to the invention can be combined with a further test sequence. In an elevator to be tested, in which a car is connected to a counterweight via at least one cable, which is guided over a drive pulley, the following steps can be performed to measure a characteristic curve of the cushion:

supporting the car or the counterweight on the force measuring device received on the respective cushion;

moving the drive pulley in a direction pointing toward the supported counterweight or car until cable slip occurs;

measuring the force acting on the force measuring device via the distance between the fixed measuring point and the counterweight or car supported on the cushion; and ascertaining the cushion characteristic curve from the measured values.

The proposed further test sequence can also be performed rapidly and easily employing the above-described measuring device. The further test sequences can also advantageously be performed using unloaded car. This further simplifies and accelerates the proposed method.

According to a further provision of the invention, an arrangement for testing the proper functionality of an elevator is provided, in which a car is movable in an elevator shaft, and an optical distance measuring device is arranged in the elevator shaft to measure a change of a distance of the car in relation to a fixed measuring point in the elevator shaft.

The proposed arrangement may be produced easily and rapidly. For this purpose, it is merely necessary, for example, to place a distance measuring device on a floor of the elevator shaft excavation space, and to align it in relation to a car lower side. Time-consuming, cumbersome, and complex attachment of sensors to cables, the drive pulley, or the like is not necessary in the arrangement according to the invention.

Reference is made to the preceding description of the method according to the invention with respect to the advantageous embodiments of the distance measuring device, in particular the use of an optical distance sensor, and the embodiments of the optical distance sensor. The features disclosed therein of the embodiments of the distance measuring device also form embodiment features of the arrangement according to the invention.

The arrangement according to the invention can be produced particularly simply using a measuring device, in which the optical distance sensor and a computer for recording and analyzing the recorded measured values are housed or combined like a kit in a case. Furthermore, a reflector and at least one force measuring device can be accommodated in the case. To produce the arrangement according to the invention, the testing engineer must merely place the case on the floor of the elevator shaft excavation, attach the reflector, which can be provided with a magnetic film, to the car lower side, and align the optical distance sensor accommodated in the case, by means of a laser beam emitted therefrom, for example, with respect to the reflector attached to the car lower side. The distance measuring device can be provided with an adjustment unit for this purpose. This can be three supports attached to the lower side of the distance measuring device, which are variable in their length, for example, like adjustment screws.

Furthermore, it is possible to support one or more force measuring devices on the cushions and to connect them via a cable connection to the measuring device. The testing engineer can subsequently initiate a predefined movement sequence of the car. All characteristic values which are necessary for testing the proper functionality of an elevator can be ascertained automatically or partially automatically from the measured values recorded using the measuring device.

Figure 2:
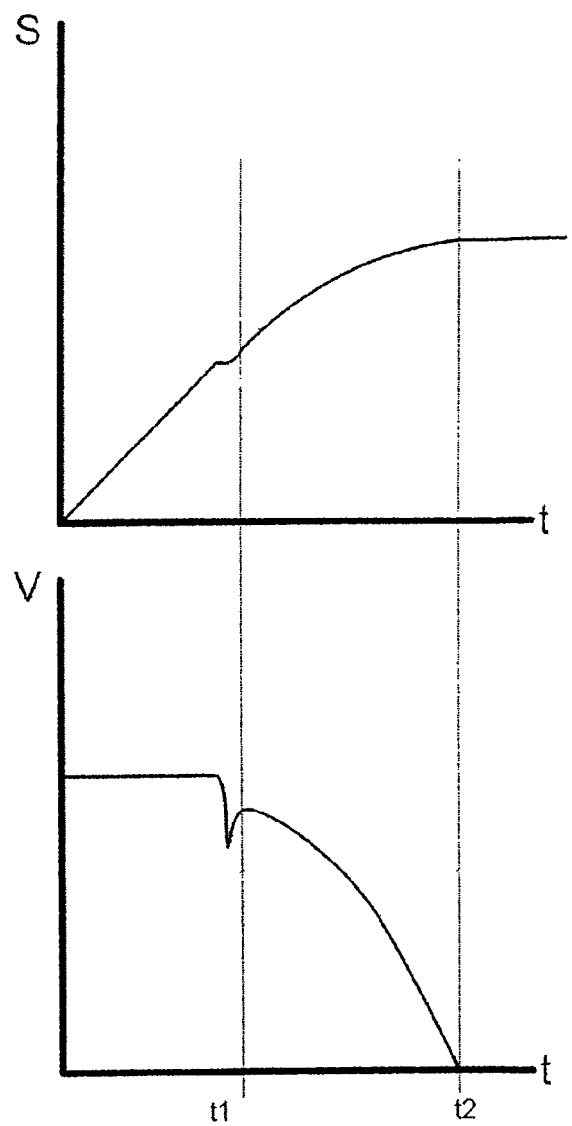
Figure 3:
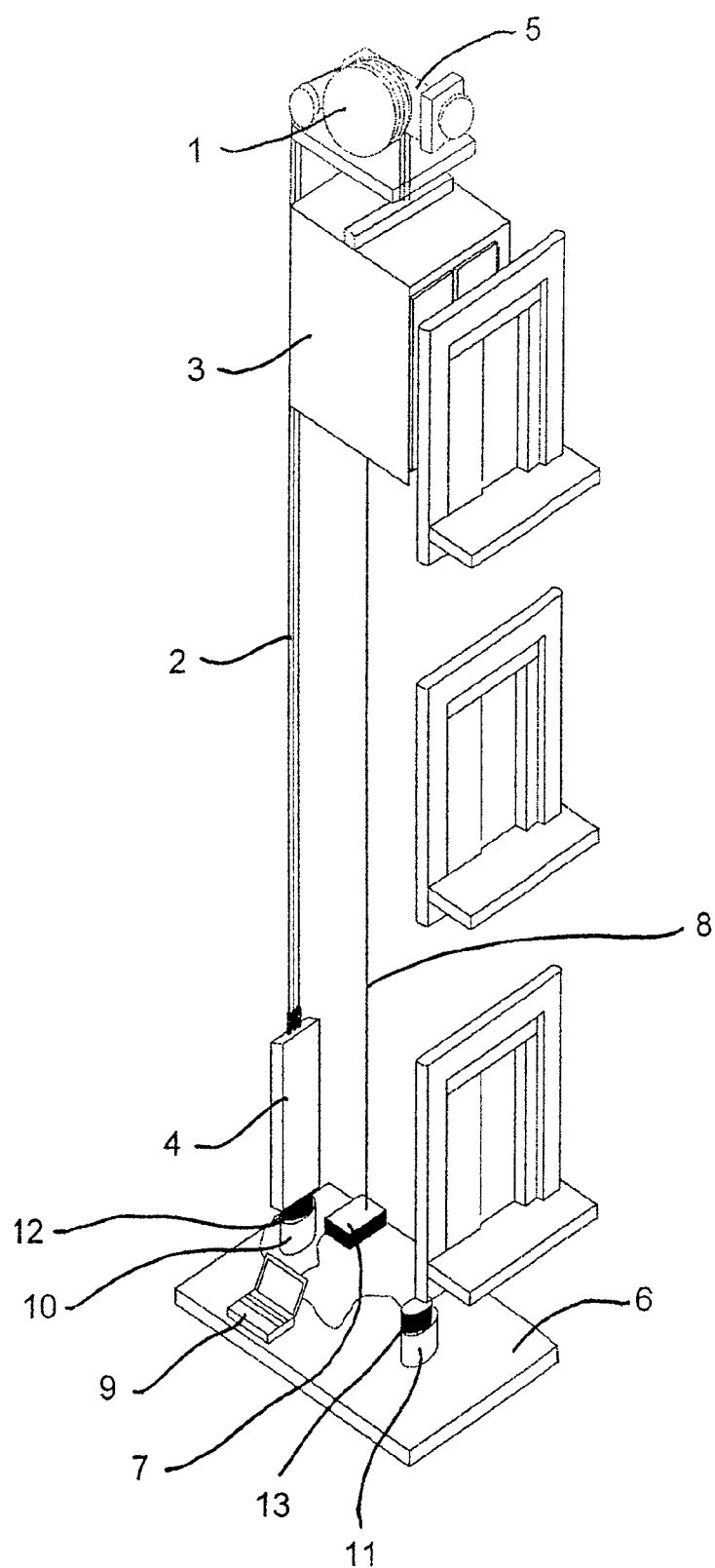
Figure 4:
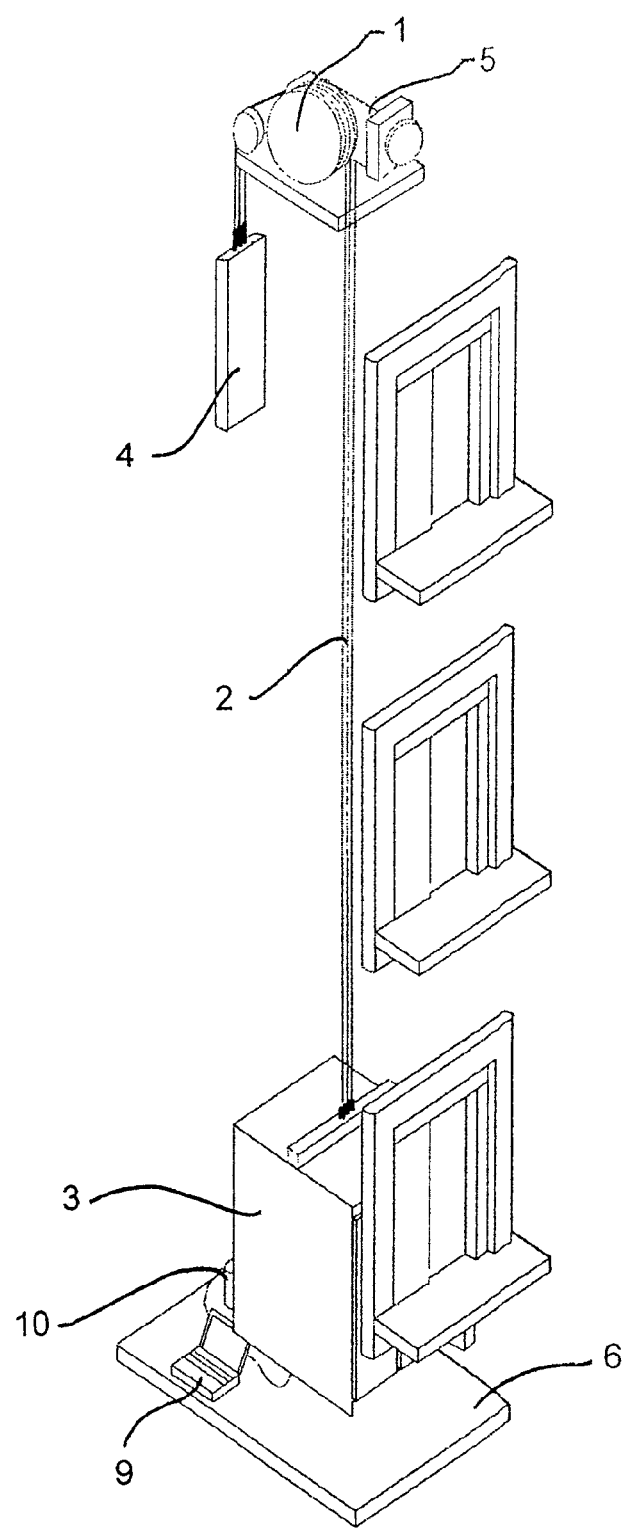
Figure 5:
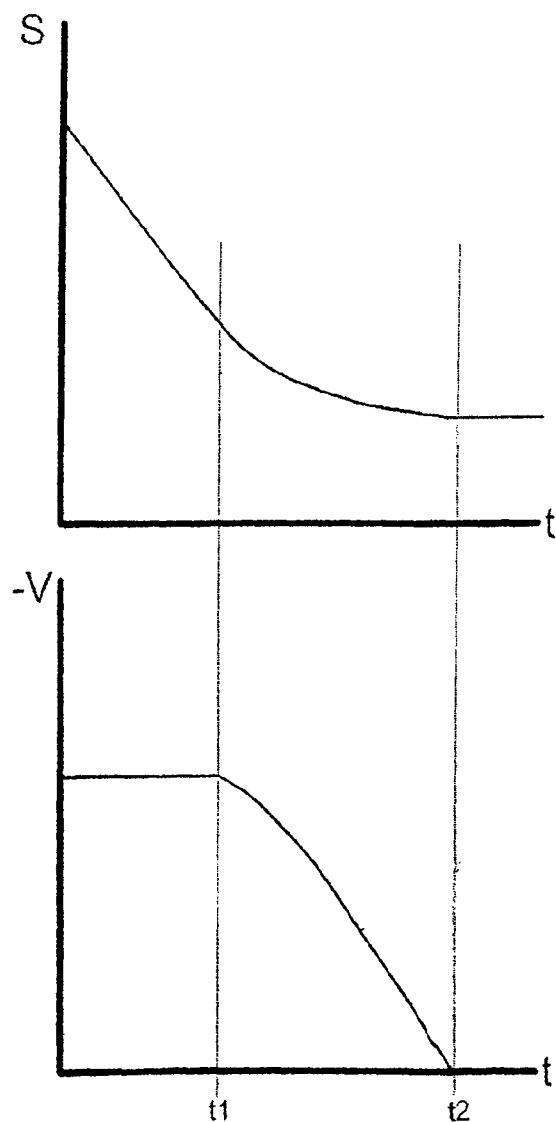
Figure 6:
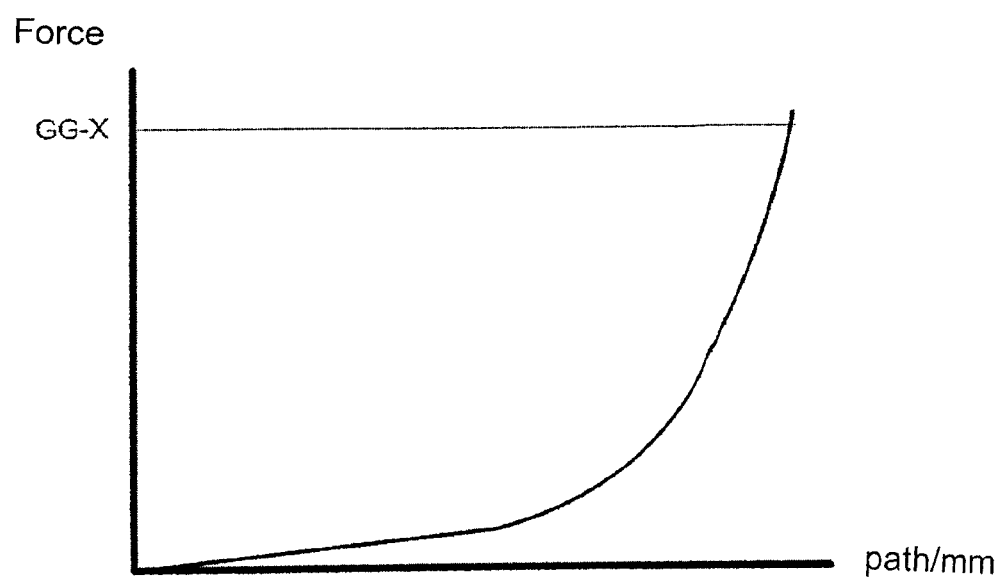
Figure 7:
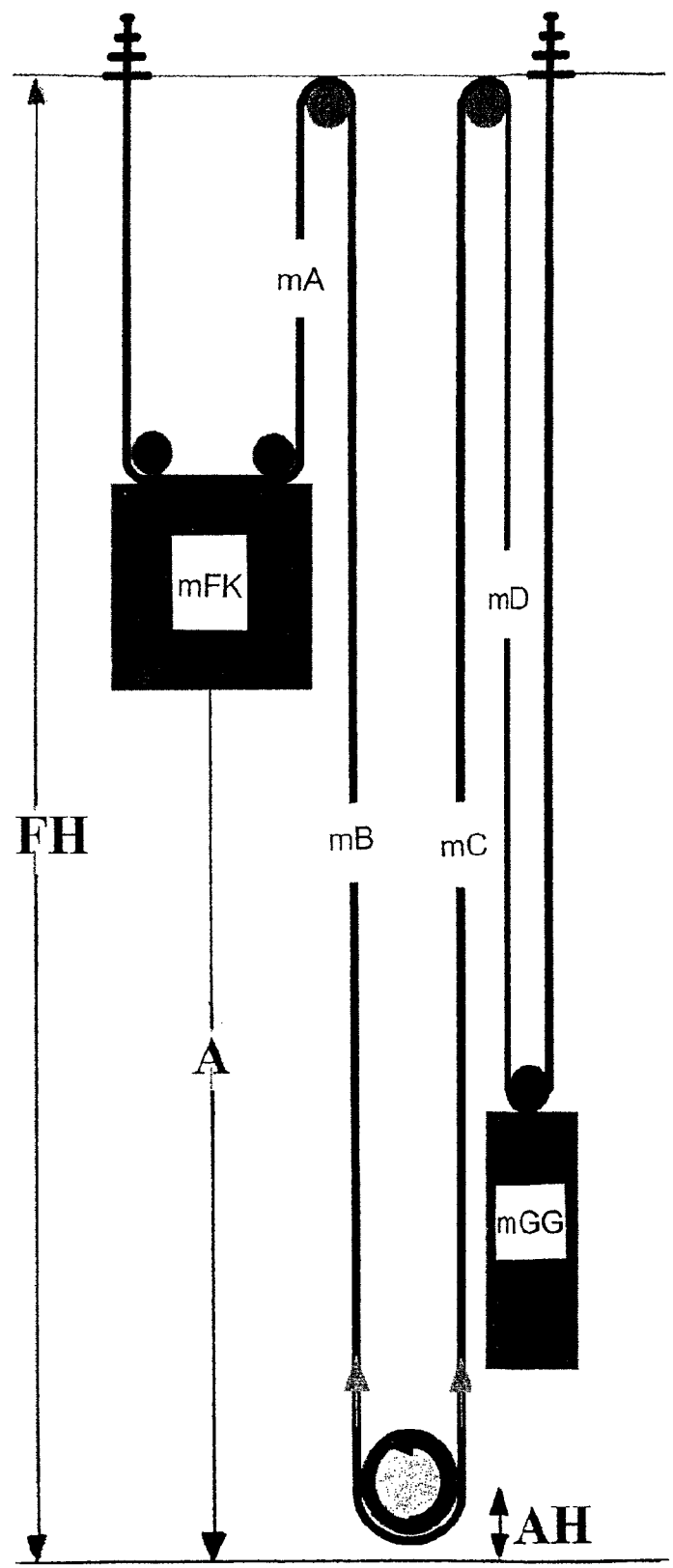
Figure 8:
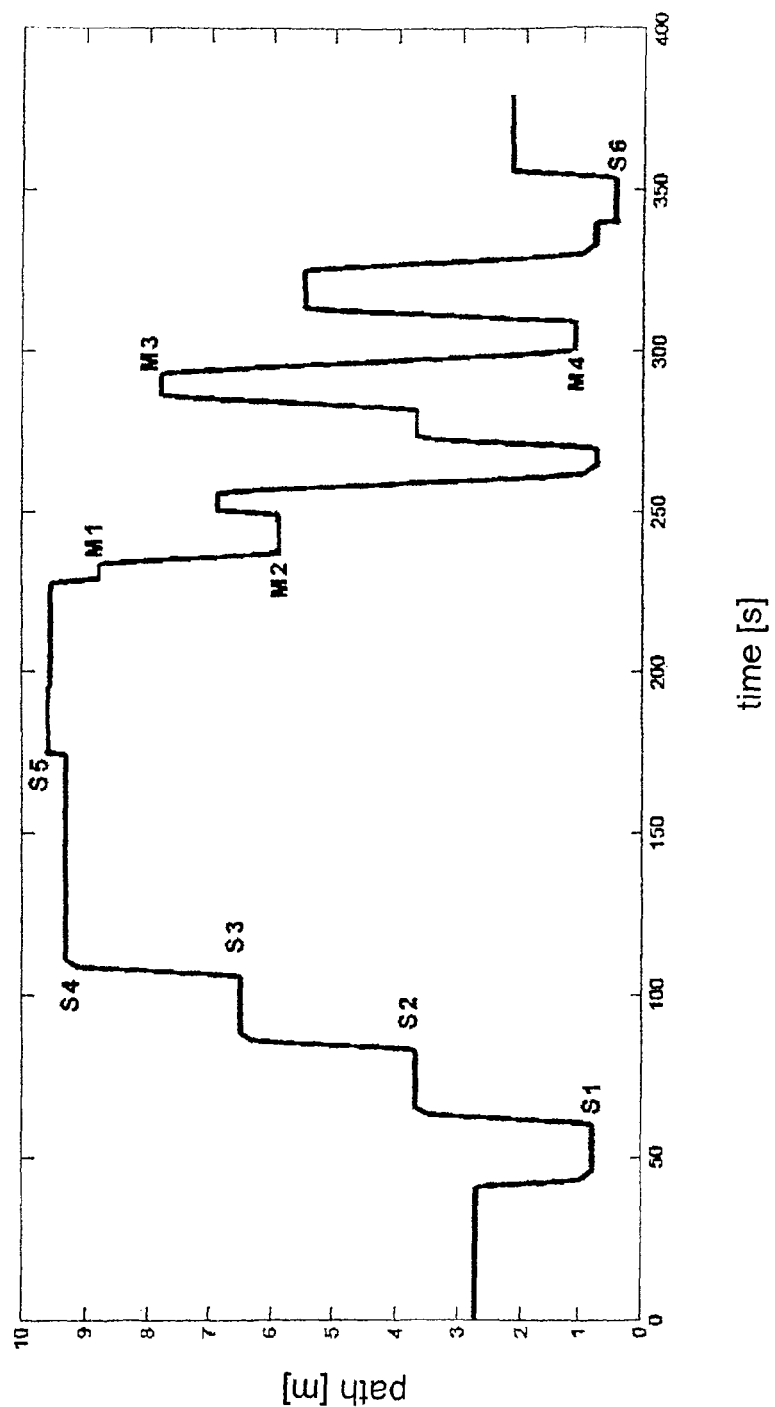
Figure 9:
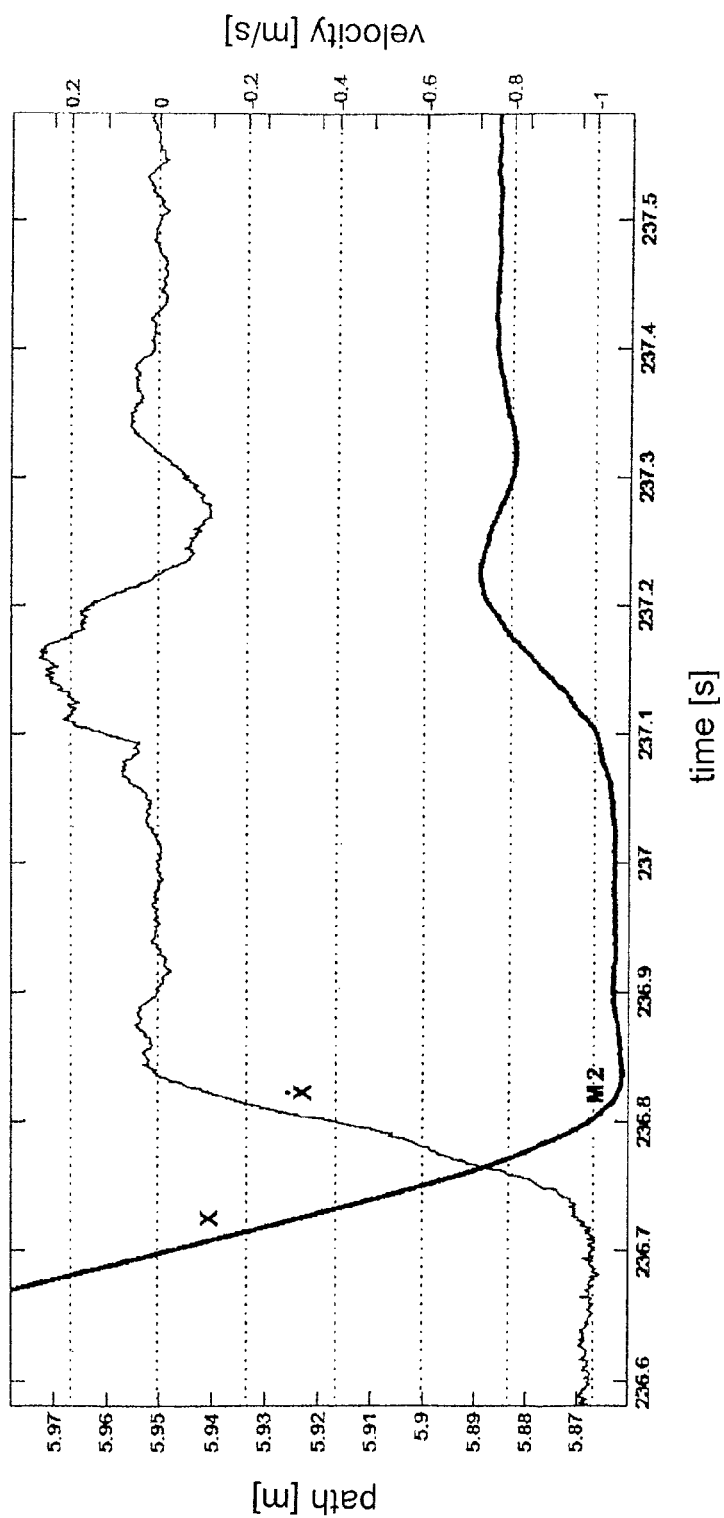
Figure 10:
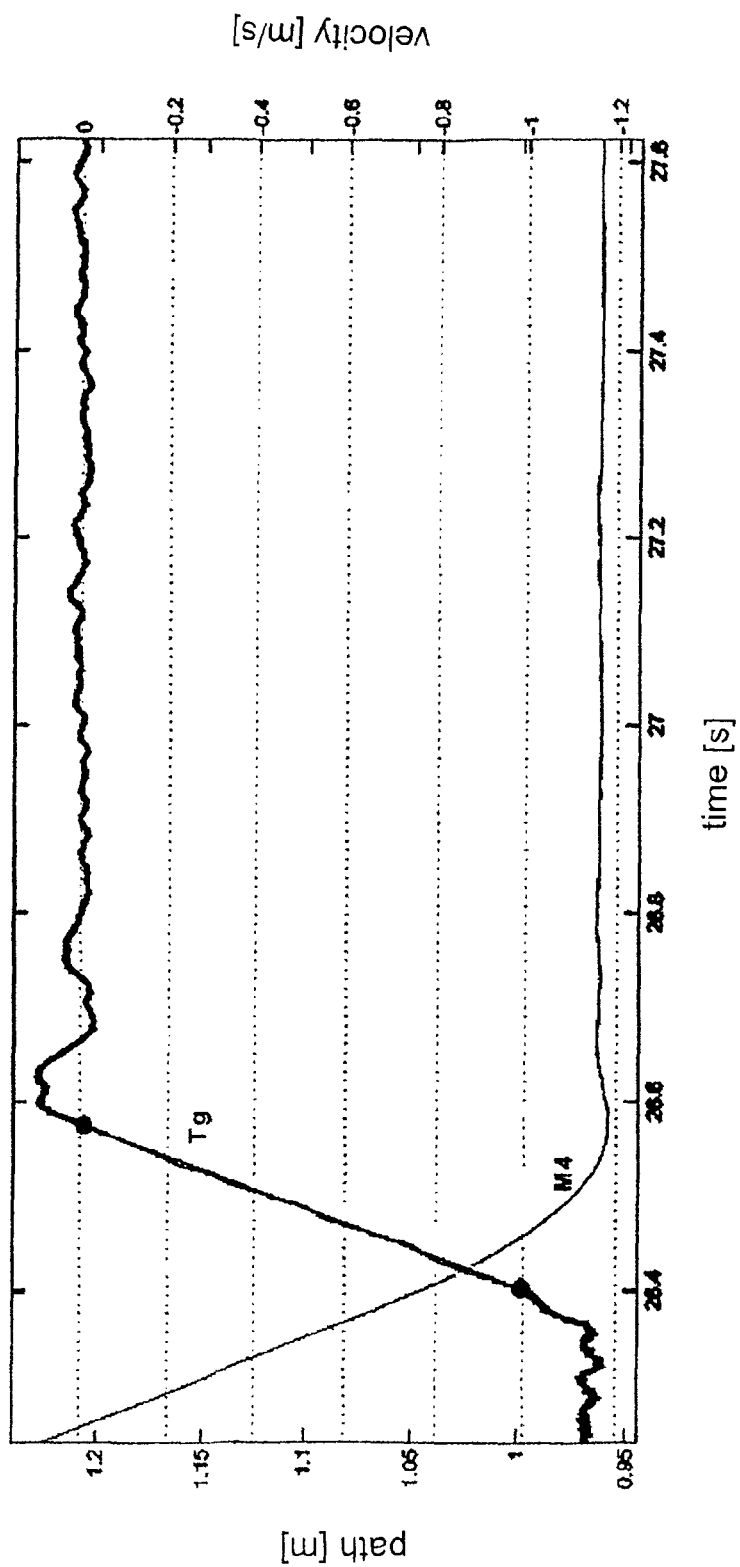
Figure 11:
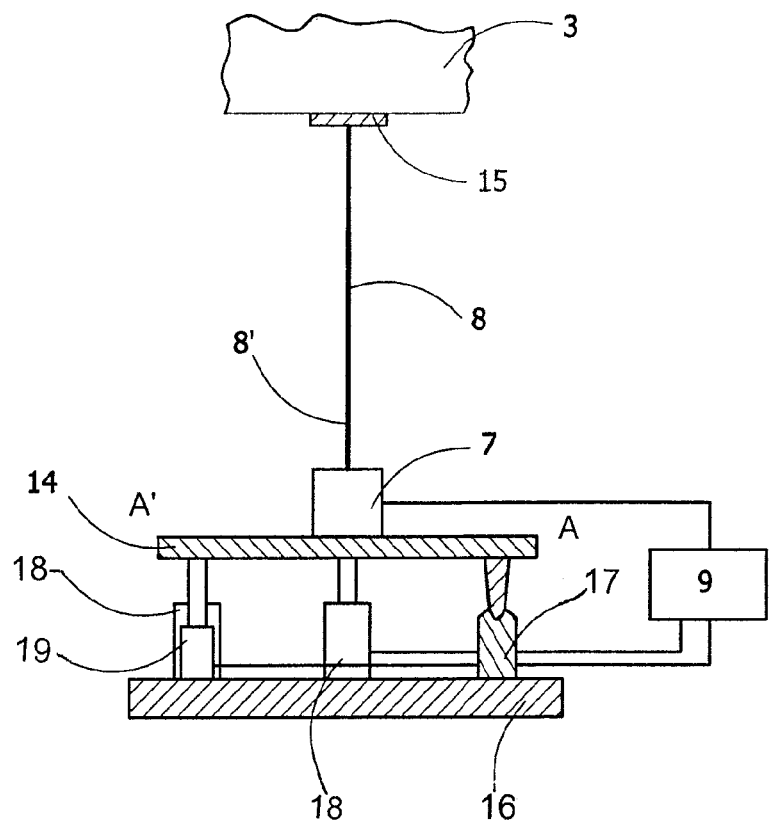
Figure 12:
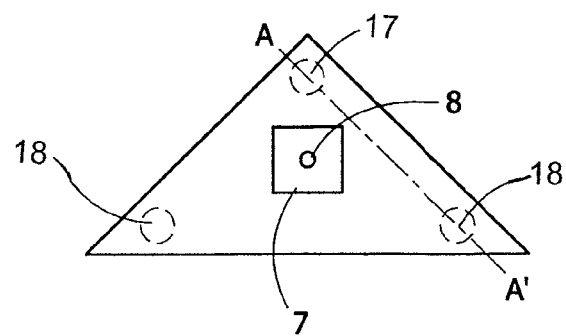
Figure 13:
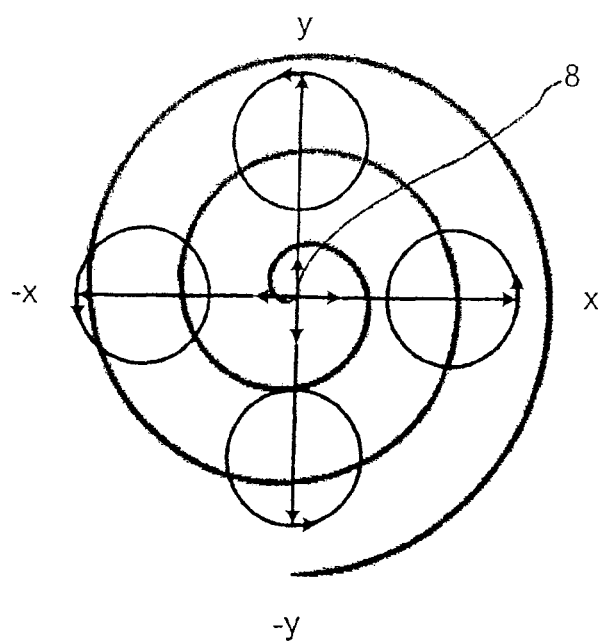

Exemplary embodiments of the invention are explained in greater detail hereafter on the basis of the drawings. In the figures:

FIG. 1 shows a first perspective partial view of an elevator having a measuring device, FIG. 2 shows the measured distance over time and the derivative of the measured curve, FIG. 3 shows a second perspective partial view of the elevator and the measuring device, FIG. 4 shows a third perspective partial view of the elevator and the measuring device, FIG. 5 shows the measured vertical distance over time and the derivative of the measured curve, FIG. 6 shows the measured distance over the force, FIG. 7 shows a schematic view of a cable arrangement, FIG. 8 shows a distance/time graph of a test sequence, FIG. 9 shows the distance/time graph according to FIG. 8 at the point M2, FIG. 10 shows the distance/time graph according FIG. 8 at the point M4, FIG. 11 shows a sectional view of a further measuring device, FIG. 12 shows a top view according to FIG. 11, and FIG. 13 shows tracking paths of a transmitted laser beam.

FIG. 1 shows a schematic and perspective partial view of a measuring device according to the invention for testing the traction capacity of an elevator. Multiple cables 2 are guided over a drive pulley 1 in FIG. 1. The cables 2 are attached at one end to a car 3 and at the other end to a counterweight 4. A drive and braking device for driving and braking the drive pulley 1 is identified by the reference numeral 5. An optical distance sensor 7 is located on a shaft floor 6 of an elevator shaft (not shown in greater detail here). A transmitted light beam 8 emitted therefrom to measure a distance is reflected by means of a reflector on a lower side of the car 3, for example, and received as a received light beam by a receiver of the optical distance sensor 7. The optical distance sensor 7 is connected to a computer 9 for recording the distance values thus measured over time. A first cushion for damping a downward movement of the counterweight 4 is identified by the reference numeral 10. A second cushion 11 is used for damping the downward movement of the car 3. The first cushion 10 and the second cushion 11 are supported on the shaft floor 6 of the elevator shaft. A first force measuring device 12 is arranged on the first cushion 10 and a second force measuring device 13 is arranged on the second cushion 11. The force measuring devices 12, 13 can be typical force transducers. The force measuring devices 12, 13 are connected to the computer 9. The computer 9 and the optical distance sensor 7 are arranged in an elevator shaft space, which is located between the shaft floor 6 and an imaginary surface, which extends approximately parallel to the shaft floor 6 and simultaneously rests on an upper side of the first cushion 10 and the second cushion 11.

FIG. 2 shows an example of a measurement of the distance, which is recorded using the computer 9, between the optical distance sensor 7 and the car 3 over time, and the first derivative −V thereof with respect to time. The deceleration a can be ascertained from the slope of the first derivative of the graph in a time interval t1 to t2 after the triggering of the braking device 5. At a given weight force on the counterweight side, i.e., the weight force of the counterweight 4 and the proportional cable weight present on the counterweight side, as well as the weight force on the car side, i.e., the weight force of the car 3 and the proportional weight force of the cable 2 on the car side, the traction capacity T in the event of an emergency stop can be ascertained according to DIN EN 81-1 according to the formula $$T = \frac{T2}{T1} = \frac{\frac{mGG*(\ddot{s}+g)}{V} - mC*g - mD*g + (mC+mD)*V*\ddot{s}}{\frac{mFK*(g+\ddot{s})}{V} - mB*g + mA*g - (mA+mB)*V*\ddot{s}} \quad (2)$$

where:

$\ddot{s}$=ascertained deceleration at the time t
A=measured distance from the shaft excavation to the floor of the car
FH=measured conveyor height
AH=calculated height of the drive after input of the floor position of the output
mFK=mass of the car
mGG=mass of the counterweight
V=suspension ratio, 1:1 or 2:1
n=number of cables
sg=specific cable weight in Kg/m
g=acceleration
mA=(FH−A)*sg*n
mB=(FH−AH)*sg*n
mC=(FH−AH)*sg*n
mD=A*sg*n.

FIG. 3 shows a partial perspective view of the elevator during a measurement of the over-traction capacity employing the measuring device. For this purpose, the counterweight 4 is supported via the first force measuring device 12 on the first cushion 10. The force acting on the first cushion 10 is measured over time by means of the first force measuring device 12. Simultaneously, the distance of the car 3 over the force can be measured using the optical distance sensor 7. In the course of the measurement, the drive pulley 1 is rotated in a direction which raises the car 3 until cable slip occurs. The so-called over-traction capacity T2'/T1' can be ascertained according to formula (2) from the force measured using the first force measuring device 12 at the time of the cable slip.

The distance of the car 3 in relation to the optical distance sensor 7 changes both when the counterweight 4 is placed on the first cushion 10 and also when the drive pulley 1 is moved in a direction which raises the car 3. The characteristic curve of the first cushion 10 can be ascertained from the recorded change of the distance of the car 3 over the measured force.

FIG. 4 shows a third perspective partial view of the elevator and the measuring device. The lower side of the car floor of the car 3 is placed here on the second force measuring device 13, which is accommodated on the second cushion 11. The force exerted on the second cushion 11 is measured using the second force measuring device 13 (not visible here). Furthermore, the distance to the lower side of the car floor is measured using the optical distance sensor 7. During the measurement, the drive pulley 1 is moved in a direction which raises the counterweight 4 until cable slip occurs.

The minimum traction capacity T2"/T1" can be ascertained according to formula (3) from the force measured using the second force measuring device 13 at the time of the cable slip.

Furthermore, the characteristic curve of the second cushion 11 can be ascertained from the measured change of the distance of the car 3 over the force.

FIG. 5 shows an example of a measurement, which is recorded using the computer 9, of the distance between the optical distance sensor 7 and the car 3 over time and the first derivative −V thereof according to time. The deceleration $\ddot{s}$ of the car 3 can be ascertained from the slope of the first derivative of the graph in a time interval t1 to t2 after the triggering of the safety gear. At a given weight force on the car side, i.e., the weight force of the car 3 and given nominal load, the deceleration Vf for the car 3 loaded with nominal load in freefall can be ascertained as a characteristic value according to the formula (1).

FIG. 6 shows an example of a cushion characteristic curve recorded using the computer 9. A measurement of the distance of a lower side of the car 3 in relation to the shaft floor 6 particularly also allows a consideration of the cable weights.

FIG. 7 schematically shows a cable arrangement. The cable weights can be taken into consideration for elevators suspended 1:1 or 1:2 according to the formula (4). All distances from the optical distance sensor (7) can be registered automatically.

For automatic consideration of the cable weights mA, mB, mC, mD, it is only still necessary to input the specific cable weight. The specific cable weight can be taken from a table, in which it is listed with respect to a cable diameter.

In particular if an optical distance sensor 7 is used, which ascertains the time change of a distance between the shaft excavation and a lower side of the car 3 from a phase shift between a transmitted light beam 8 and a received light beam, a test of the proper functionality of an elevator can be performed particularly rapidly, efficiently, and easily. The efficiency of the proposed method can be increased further if the optical distance sensor 7 is combined with force measuring device 12, 13.

The respective relevant cable weights can be ascertained automatically using the path measurement. Only the number of cables and the cable diameter must be input manually.

The half-load equalization can be ascertained automatically, in that the counterweight 4 is lowered onto the cushion 10 having the force measuring device 12 with the brake open. The force measuring device 12 then measures:

$$Fp = \frac{mGG*g}{V} + mD*g - mC*g - \frac{mFK}{V}*g - mA*g + mB*g \quad (7)$$

$$Fm = Fp - mD*g + mC*g + mA*g - mB*g \quad (8)$$

In the case of half-load equalization, the measured value must be 50% of the specified nominal load. The load equalization in percent:

$$La=(Fm/(NL*g))*100 \quad (9)$$

where:

Fp=measured force on the cushion of the counterweight
Fm=ascertained force on the cushion without cable weights
mFK=mass of the car
mGG=mass of the counterweight
La=load equalization in percent
NL=nominal load specified in the car
V=suspension ratio, 1:1 or 1:2
g=acceleration of gravity
mA=(FH−A)*sg*n
mB=(FH−AH)*sg*n
mC=(FH−AH)*sg*n
mD=A*sg*n.

The car weight can be ascertained automatically according to the following methods:

Method 1:

The car 3 is moved onto the cushion 11, so that a deceleration>1 g is achieved.

$$g * mFK = \frac{F_{m1}}{\ddot{s}} \quad (5)$$

where:
g=acceleration of gravity
$F_{m1}$=measured force at time $t_1$
$\ddot{s}$=deceleration at time $t_1$
mFK=mass of the car.

Method 2:

The counterweight 4 is moved close to the cushion 10, for example, the car 3 is moved into the uppermost stop. The brake of the drive is now opened. The counterweight 4 is braked by the force measuring device 12, which lies on the cushion 10. A deceleration a1 results at time t1. In addition, the first force Fm1 arising on the force measuring device 10 is measured at t1. In the case of a deceleration of a1<1 g, the following equations apply (with neglected cable weights and 1:1 suspension here for simplicity):

$$F_{m1} = mGG * g + mGG * a_1 - mFK * g + mFK * a1 \quad (10)$$

$$\Leftrightarrow mFK = \frac{F_{m1} - mGG * g - mGG * a_1}{a_1 - g} \quad (11)$$

If the car 3 is stationary and the counterweight 4 rests on the force measuring device 12 on the cushion 10, the second force Fm2 can be measured and the following equation applies:

$$mGG = \frac{F_{m2}}{g} + mFK \quad (12)$$

The following equation results through substitution:

$$mFK = \frac{F_{m1} - \left(\frac{F_{m2}}{g} + mFK\right) * g - \left(\frac{F_{m2}}{g} + mFK\right) * a_1}{a_1 - g} = \frac{F_{m1} - F_{m2} - F_{m2} * \frac{a_1}{g}}{2 * a_1} \quad (6)$$

where:
mGG=mass of the counterweight
mFK=mass of the car
$F_{m1}$=measured first force on the force measuring device at time $t_1$
$F_{m2}$=measured second force on the force measuring device
g=acceleration of gravity
$a_1$=deceleration at time $t_1$.

The deceleration $a_1$ can again be ascertained by the second derivative of the measured distance according to time.

Of course, the two methods are also capable of ascertaining the counterweight. The ascertained values such as counterweight, car weight, proportional cable weights, speed, and conveyor height are provided automatically for the calculation of the dynamic traction capacity, the traction capacity upon loading of the car 3, the over-traction capacity, and the cushion characteristic curve. The technician no longer has to look for the data in the test log book.

FIGS. 8 to 10 show distance/time graphs, which were obtained on a test elevator employing a distance measuring device having an optical distance sensor. In the test elevator, a car 3 is connected to a counterweight 4 via multiple cables 2, which are guided over a drive pulley. The car 3 has a safety gear. A drive device for driving the drive pulley 1 is provided with a braking device. A change of the distance A has been measured with time resolution in relation to a car lower side using the optical distance sensor. The measured values have been stored on a computer 9 and subsequently analyzed.

FIG. 8 shows a distance/time diagram of a complete sequence. The car 3 has first been moved here for calibration purposes from a first story S1 to the next higher stories S2, S3, S4. The cable masses mA, mB, mC, and mD can thus be ascertained. The point S5 describes a so-called "overtravel", at which the counterweight rests on the cushion corresponding thereto.

The braking device has been disengaged at point M1 and the safety gear has been triggered at point M2. The braking device has again been disengaged at point M3 and the braking device has been actuated at point M4. At point S6, the car 3 rests on the cushion corresponding thereto in the shaft excavation.

FIG. 9 shows the distance/time graphs according to FIG. 8 in the area of the point M2 in higher resolution. Furthermore, the speed/time curve obtained by derivation has been calculated and also shown for the distance/time curve. The increase of the distance in the car 3 observable approximately at the time 237.2 seconds is caused by the returning counterweight 4. By implication, this shows that the counterweight 4 has no influence on the measurement of the deceleration $\ddot{s}$, according to regulations. The deceleration Vf can be ascertained by ascertaining the slope of the essentially linear area in the speed/time graph.

FIG. 10 shows the distance/time diagram according to FIG. 8 in the area of the point M4 in higher resolution. The first derivative of the distance/time curve is also shown here. A deceleration at the point M4 can also be determined here by applying the tangent Tg, which is shown in FIG. 10, to the linear area in the speed/time graph while ascertaining its slope. The traction capacity T can be ascertained from the ascertained deceleration S2 according to formula (2).

FIGS. 10 and 11 show a further measuring device. An optical distance sensor 7 is mounted upon a supporting plate 14. The optical distance sensor 7 comprises a transmitter for emitting a laser beam 8 or light beam, respectively, and a receiver for receiving a reflected laser beam 8'. Reference numeral 15 designates a reflector plate or foil which is mounted at a lower side of the car 3.

As can be seen from FIGS. 11 and 12 the supporting plate 14 may have the form of a right triangle. The supporting plate 14 is supported with respect to a base plate 15 by a joint 17 which holds the supporting plate 14 at that corner of the triangle at a constant distance relative to the base plate 16. In the areas of the further corners of the triangle the supporting plate 14 is supported relative to the base plate 16 by actuators 18. Each actuator 18 may be driven by an electric motor 19. Electric motors 19 are controlled by a control which may be the computer 9. The control 9 receives input signals from the receiver of the optical distance sensor 7.

The function of the further measuring device is now explained with reference to FIG. 13.

Control or computer 9, respectively, continuously detects during a measurement cycle whether the receiver receives reflected laser beam 8'. As soon as the receiver does not detect the reflected laser beam 8' it is not possible to calculate distance values. A this time an algorithm is started by which the transmitted laser beam 8 is moved to describe predetermined a tracking path on the lower side of the car 3 in order to again find a reflector plate 15.

By controlling actuators 18 the supporting plate 14 is tilted and therewith the transmitted laser beam 8 is moved to describe a tracking path on the car lower side. The movements of the actuators 18 are controlled such that the tracking path of the transmitted laser beamer 8 on the car lower side is always the same. This is achieved by correcting further values for producing control-signals for the actuators 18 by a distance value which was measured immediately before the reflected laser beam 8' was no more detected by the receiver.

In a first step of tracking the reflector plate 15 the transmitted laser beam 8 is moved in x, -x, y and -y directions as can be seen from FIG. 13. If the transmitted laser beam 8 is again reflected the transmitted laser beam 8 is further on moved several centimeters in the respective tracking direction in order to position the transmitted laser beam 8 nearby the center of the reflecting plate 15. If during this movement the transmitted laser beam 8 is again moved outside the reflector plate 15 the transmitted laser beam 8 is then moved, in a second step, in form of a circle the diameter of which is part of the former straight moving direction. If then again reflection occurs the position of the reflector plate 15 can be calculated and the transmitted laser beam 8 can be adjusted to be again reflected at the reflector plate 15.

If during the movement of the transmitted laser beam 8 along the path of a circle no reflection is detected then, in a third step, the transmitted laser beam 8 is moved in form of a spiral until the reflector plate 15 is found. Then the first and/or second step may be performed in order to refine the new position of the transmitted laser beam 8 with respect to the reflector plate 15.

Although the proposed tracking method has been disclosed with respect to the tilting of the supporting plate 14 on which the optical distance sensor 7 is mounted it has to be understood that the tracking of the transmitted laser beam 8 may also be carried out by other techniques, like by the movement of at least one mirror or the like.

LIST OF REFERENCE SIGNS 1 drive pulley
2 cable
3 car
4 counterweight
5 drive and braking device
6 shaft floor
7 optical distance sensor
8 transmitted light beam
8' reflected laser beam
9 computer
10 first cushion
11 second cushion
12 first force measuring device
13 second force measuring device
14 supporting plate
15 reflector plate
16 base plate
17 joint
18 actuator
19 electric motor
A distance
S1, S2, S3, S4 story
Tg tangent

The invention claimed is:

1. A method for testing the functionality of an elevator in which a car having a lower side is movable in an elevator shaft having an elevator shaft excavation space and a characteristic value is ascertained under predefined test conditions to determine the proper functionality of the elevator, comprising measuring a change of distance between the car and a fixed measuring point in the elevator shaft in a movement direction of the car by an optical distance measuring device and a reflector, the optical measuring device being attached either to the fixed measuring point or to the car and the reflector is correspondingly attached to the car or the fixed measuring point, whereby said optical distance measuring device transmits a light beam to the reflector and received a reflected light of the reflector for measuring said distance, and automatically keeping the transmitted light beam of the transmitted light beam of the optical distance measuring device in alignment with the reflector by a closed-loop control for detecting whether or not the transmitted light beam is reflected at the reflector while moving the transmitted light beam in accordance with a predetermined algorithm along a first straight line and thereafter along a second straight line which is perpendicular to the first straight line and thereafter along a circle.

2. A method according to claim 1 wherein the reflector is attached to the lower side of the car.

3. A method according to claim 1 further comprising tracking the reflector by the transmitted light in dependence of a distance between the lower side of the car and the optical distance measuring device for keeping the transmitted light beam of the optical measuring device in alignment with the reflector.

4. A method according to claim 2 wherein said tracking of the reflector by the transmitted light beam is in dependence of a distance between the lower side of car and the optical distance measuring device for keeping said transmitted light beam of the optical distance measuring device in alignment with the reflector.

5. A method according to claim 3, wherein said distance is a last distance value being measured just before it was detected that the transmitted light is no longer reflected by the reflector.

6. A method according to claim 4 wherein said distance is a last distance value being measured just before it was detected that the transmitted light beam is no longer deflected by the reflector.

7. An arrangement for testing the functionality of an elevator in which a car having a lower side is movable in an elevator shaft having an elevator excavation space, comprising an optical distance measuring device for measuring a change of a distance of the car in relation to a fixed measuring point in the elevator shaft in a movement direction of the car, said optical distance measuring device being attached either to the fixed measuring or to the car, a reflector correspondingly attached to the car or the fixed measuring point, whereby said optical measuring device transmits a light beam to said reflector and receives a reflected light beam of said reflector for measuring said distance, said optical distance measuring device comprising a closed-loop control unit for automatically keeping a transmitted light beam in alignment with said reflector such that as soon as the transmitted light beam is not reflected by the reflector the transmitted light beam is moved in accordance with a predetermined algorithm until the transmitted light beam is again reflected by the reflector, said reflected light beam being moved along a first straight line and thereafter along a second straight line which is perpendicular to the first straight line and thereafter along a path of a circle.

8. An arrangement according to claim 7 wherein the reflector is attached to the lower side of the car.

9. An arrangement according to claim 8 wherein said closed-loop control unit calculates a tracking path of the transmitted light beam in dependence of a distance between the lower side of the car and said optical distance measuring device.

10. An arrangement according to claim 7 wherein said closed-loop control unit calculates a tracking path of the transmitted light beam in dependence of a distance between the lower side of the car and said optical distance measuring device.

11. An arrangement according to claim 10 wherein said distance is a last distance value being measured just before it was detected that the transmitted beam is not reflected by said reflector any more.

\* \* \* \* \*